(12) United States Patent
Smart

(10) Patent No.: US 12,078,263 B2
(45) Date of Patent: Sep. 3, 2024

(54) MONITORING ENERGY USE ON FLOW CONTROLS

(71) Applicant: Dresser, LLC, Houston, TX (US)

(72) Inventor: Harold Randall Smart, Portsmouth, RI (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 17/732,610

(22) Filed: Apr. 29, 2022

(65) Prior Publication Data

US 2023/0349486 A1 Nov. 2, 2023

(51) Int. Cl.
*F16K 37/00* (2006.01)
*F16K 31/122* (2006.01)
*F16K 31/126* (2006.01)

(52) U.S. Cl.
CPC ...... *F16K 37/0083* (2013.01); *F16K 37/0033* (2013.01); *F16K 37/0041* (2013.01); *F16K 37/005* (2013.01); *F16K 37/0091* (2013.01); *F16K 31/1221* (2013.01); *F16K 31/1262* (2013.01)

(58) Field of Classification Search
CPC .............. F16K 37/0091; F16K 37/005; F16K 37/0083; F16K 31/1221; F16K 31/1262; F16K 37/0041; F16K 37/0033
See application file for complete search history.

(56) References Cited

U.S. PATENT DOCUMENTS

| | | | |
|---|---|---|---|
| 5,163,353 A | 11/1992 | Horstmann et al. | |
| 5,431,182 A | 7/1995 | Brown | |
| 5,573,032 A | 11/1996 | Lenz et al. | |
| 2014/0305298 A1* | 10/2014 | Beck | F15B 15/14 91/1 |
| 2018/0231144 A1* | 8/2018 | Anderson | G05B 23/0235 |
| 2023/0213115 A1* | 7/2023 | Smart | F16K 37/0083 137/554 |

FOREIGN PATENT DOCUMENTS

DE  102006011503 A1  9/2007

OTHER PUBLICATIONS

Braxton, Jim, "Get Smart About control Valve Positioners," Chemical Processing (Jun. 14, 2019).
Dufresne, Joseph, "Considering Control Valve Efficiency," P.I. Process Instrumentation (Jul. 23, 2014).

* cited by examiner

*Primary Examiner* — Atif H Chaudry
(74) *Attorney, Agent, or Firm* — Paul Frank + Collins P.C.

(57) ABSTRACT

A flow control that is configured to monitor energy use. These configurations may include a controller that delivers a signal to pressurize a pneumatic actuator. This controller may have software that can calculate energy use based on pressure of the signal and, for example, changes in position of a valve. This feature can provide real-time data that operators can use to identify potential problems on their process lines. In one implementation, the operators can flag devices that exhibit energy use that trends away from baseline levels. These devices may have inherent issues that can manifest into larger, more catastrophic problems, potentially causing quality problems with end product or requiring the operating to shut-down the process line altogether.

20 Claims, 6 Drawing Sheets

MONITORING ENERGY USE ON FLOW CONTROLS

BACKGROUND

Flow controls play a large role in many industrial settings. Power plants and industrial process facilities, for example, use different types of flow controls to manage flow of material, typically fluids, throughout vast networks of pipes, tanks, generators, and other equipment. These devices may include control valves, which provide active control of flow, through an exchange of control signals with a central control network.

Control valves often have an actuator to regulate flow. This actuator may require a fluid signal in the form of, for example, compressed air that flows into (and out of) the device. Most facilities are set up with a delivery network to provide the compressed air to each individual control valve on a process line. This network likely includes one or more compressors to deliver the compressed air at a pressure necessary to pressurize the actuator for use in the system. Of course, these compressors require power as a precursor to their operation. This power likely arises from power plants that, often, burn fossil fuels and emit greenhouse gas into the environment.

SUMMARY

The subject matter of this disclosure relates to improvements to process performance and optimization. Of particular interests are embodiments that can monitor energy use of individual control valves. These embodiments may generate valuable data that gives operators insight into operation of their process line. This feature may allow operators to make better valve selections, to tune their process loops, or even to evaluate operation of their overall plant.

DRAWINGS

Reference is now made briefly to the accompanying drawings, in which.

Figure 1:
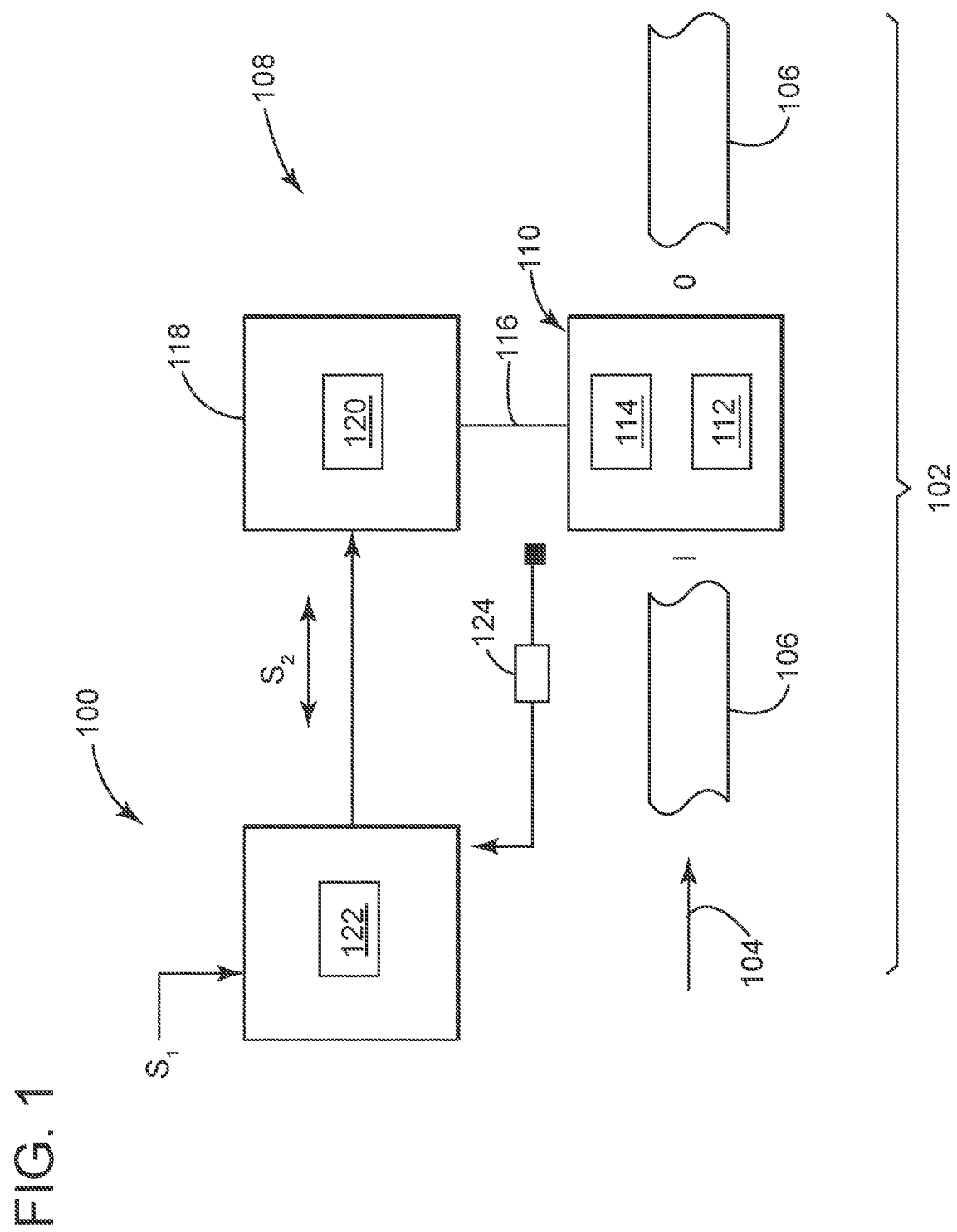
FIG. 1 depicts a schematic diagram of an example of a controller.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

The drawings and any description herein use examples to disclose the invention. These examples include the best mode and enable any person skilled in the art to practice the invention, including making and using any devices or systems and performing any incorporated methods. An element or function recited in the singular and proceeded with the word "a" or "an" should be understood as not excluding plural of said elements or functions, unless such exclusion is explicitly recited. References to "one embodiment" or "one implementation" should not be interpreted as excluding the existence of additional embodiments or implementations that also incorporate the recited features.

DESCRIPTION

The discussion now turns to describe features of the embodiments shown in drawings noted above. These embodiments use data that is readily available to help operators evaluate their process lines. This feature avoids the need for new or additional hardware. It also provides insight that may translate into solutions to maintain quality control, to provide timely and appropriate device maintenance, or to understand overall process integrity. As an added benefit, the proposed design may help to reduce power use across the process line (or plant generally), which can translate into valuable reductions in greenhouse gas emissions. Other embodiments are within the scope of this disclosure.

FIG. 1 depicts an example of a controller 100. This example is found in a distribution network 102, typically designed to carry material 104 through a network of conduit 106. The controller 100 may be part of a flow control 108 that has a valve body 110 to connect in-line with the conduit 106. The valve body 110 may house a seat 112 and a closure member 114, which can move to positions relative to the seat 112 to regulate flow of material 104. A valve stem 116 may connect the closure member 114 with an actuator 118 that includes a piston assembly 120. In one implementation, the controller 100 may have operating hardware 122 that converts an incoming pneumatic supply signal $S_1$ into an actuator control signal $S_2$ that pressurizes the actuator 118. A feedback mechanism 124 provides data about operating conditions or parameters on the flow control 108.

Broadly, the controller 100 may be configured to evaluate energy use. These configurations may provide data, in real-time, that corresponds with operation of pneumatic systems, like those found in industrial process facilities. This data may show anomalies in energy use that may occur on a device-by-device basis on a process line. These anomalies may, in turn, cause operators to investigate the underlying cause and to implement an appropriate response. This feature can lead to process improvements or device maintenance or repair prior to any problems that may degrade output or, possibly, lead to catastrophic failure or significantly lower yield in end product.

The distribution system 102 may be configured to deliver or move resources. These configurations may embody vast infrastructure. Material 104 may comprise gases, liquids, solids, or mixes, as well. The conduit 106 may include pipes or pipelines, often that connect to pumps, boilers, and the like. The pipes may also connect to tanks or reservoirs. In many facilities, this equipment forms complex networks.

The flow control 108 may be configured to regulate flow of material 104 through the conduit 106 in these complex networks. These configurations may include control valves and like devices. The valve body 110 in such devices is often made of cast or machined metals. This structure may form a flange at the openings I, O. Adjacent pipes 106 may connect to these flanges to allow material 104 to flow through the device, for example, through an opening in the seat 112. The closure member 114 may embody a metal disc or metal "plug." The valve stem 116 may embody an elongate cylinder or rod that connects on one end to this plug. The other end of this rod may couple with the actuator 118. Often, the piston assembly 120 in the actuator 118 may include a piston and a spring (or springs) that together generate a load on the valve stem 116. It is not uncommon, though, that a flexible diaphragm may take the place of the piston in some designs. The resulting load regulates the position of the plug 114, which in turn manages flow of material 104 through the seat 112 and into the pipes 106 downstream of the device.

The operating hardware 122 may be configured to process and generate signals. These configurations may connect to a control network (or "distributed control system" or "DCS"), which maintains operation of all devices on process lines to ensure that materials flow in accordance with a process. The DCS may generate control signals with operating parameters that describe or define operation of the control valve 108 for this purpose. The operating hardware 122 may employ electrical and computing components (e.g., processors, memory, executable instructions, etc.). These components may also include electro-pneumatic devices that operate on incoming pneumatic supply signal $S_1$. These components ensure that the outgoing actuator control signal $S2$ to the actuator 118 is appropriate for the control valve 108 to supply material 104 downstream according to process parameters.

The feedback mechanism 124 may be configured to provide data that corresponds with operation of the flow control 108. These configurations may measure various operating parameters or conditions that prevail on, at, or proximate the flow control 108. For example, the controller 100 may include a pressure sensor that monitors pressure of the actuator control signal $S2$. The feedback mechanism 124 may also include a sensor to monitor physical position of parts on the device. This sensor may, for example, monitor position of the closure member 114. In one implementation, a mechanical linkage may couple the valve stem 116 with a rotatable disc in the controller 100. The disc may rotate in response to the mechanical linkage. This feature changes position of magnets relative to a flux sensor, which in turn indicates the position of the closure member 114.

Figure 2:
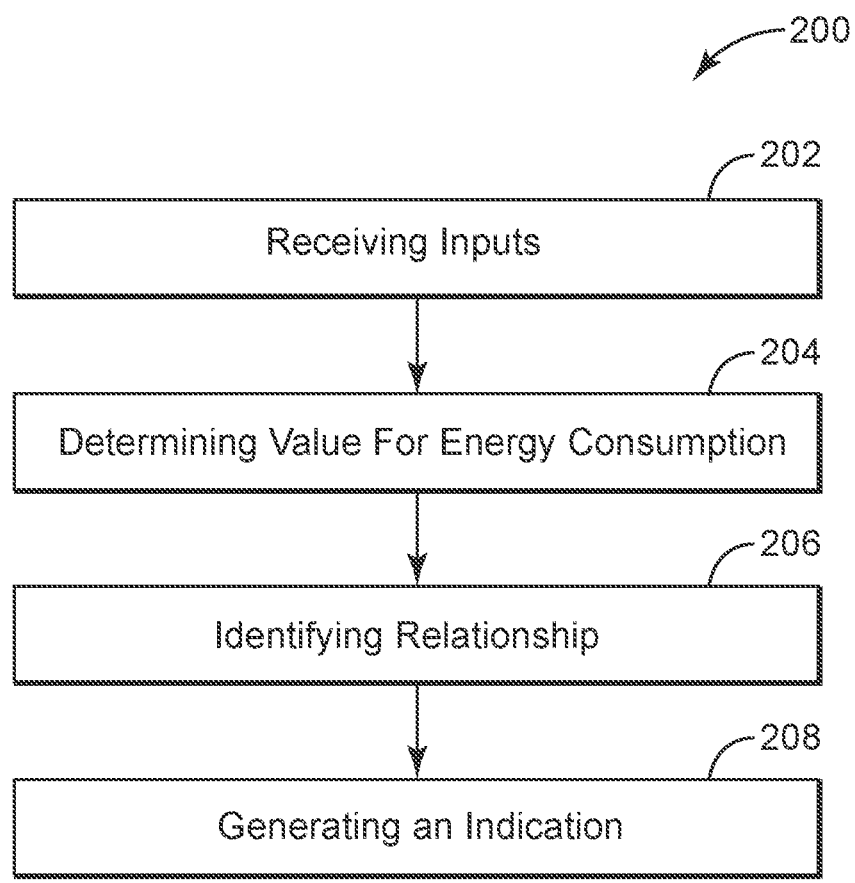
FIG. 2 depicts a flow diagram for an exemplary method of operating the controller of FIG. 1.

FIG. 2 depicts a flow diagram of an example of steps for a method 200 for operating the controller 100. These steps may correspond with executable instructions, like computer or software programs, that configure the controller 100 for certain operations. The instructions may, for example, process data to arrive at values that define operation of the flow control 108. These operations may identify the energy that the flow control 108 consumes, stores, or releases as part of its use in a process line. In one implementation, the method 200 may include, at stage 202, receiving inputs or feedback, and at a stage 204, determining a value for energy consumption. The method 200 may also include, at stage 206, identifying a relationship between this value and a threshold. The method 200 may further include, at stage 208, generating an indicator in response to this relationship.

At stage 202, the controller 100 may receive certain inputs. These inputs may include data on operating parameters for the device. This data may include "actuator pressure" and position information from the feedback mechanism 124. The controller 100 may use this information to determine energy usage or consumption. It is possible, as well, that the controller 100 may write or store this information to memory. This feature can preserve data as an operating history for the flow control 108 or, in the case of a process line, a plurality of flow controls 108 resident as part of the larger system.

At stage 204, the controller 100 may calculate the energy that the flow control 108 uses or consumes based on the inputs, including actuator pressure and position. On spring-return devices, the spring stores and releases energy as it compresses and relaxes in response to an increase or a decrease in actuator pressure. This feature provides a metric to identify the total energy use of the flow control 108. In one implementation, energy use may correspond with Equations (1) and (2) below:

$$E = \frac{W}{T}, \quad \text{Equation (1)}$$

$$E = \frac{W}{t_1 - t_0}, \quad \text{Equation (2)}$$

where E is energy, W is work, and T is a time interval (for example, $t_1 - t_0$ for purpose of this calculation). Work W may depend on the configuration or use of the actuator 116. These configurations may include "single-acting" devices and "double-acting" devices.

Figure 3:
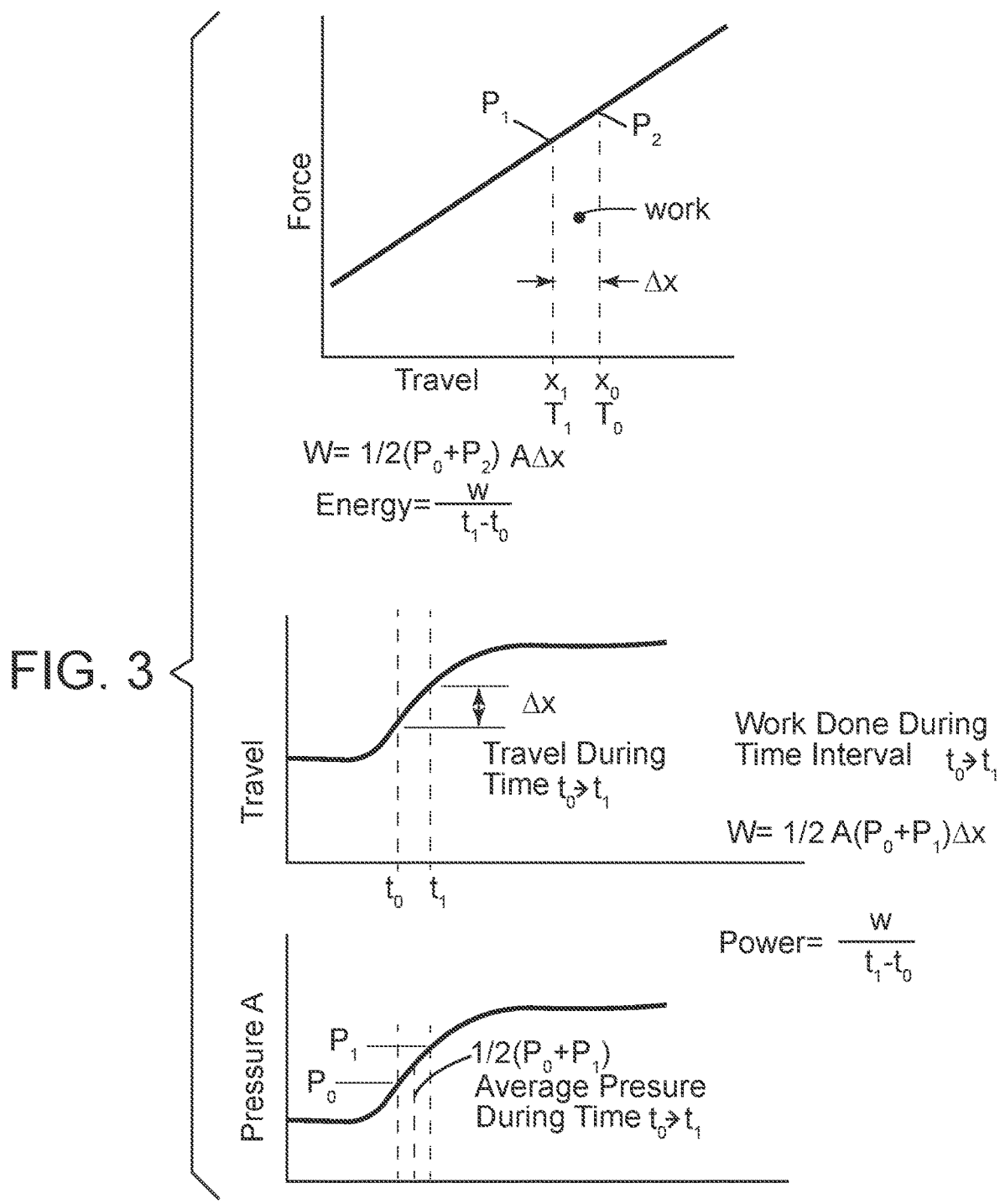
FIG. 3 depicts a performance curve for an example of an actuator for use with the controller of FIG. 1.

FIG. 3 illustrates a performance curve for an example of a single-acting device. In this device, actuator pressure acts on the actuator piston in a direction that is opposite the force of the spring. The performance curve shows that a change in actuator pressure ($P_0 \rightarrow P_1$) compresses the spring ($x_0 \rightarrow x_1$). Work W corresponds with the area under the performance curve and may be calculated according to Equations (3) and (4) below:

$$W = A \times P_{avg} \times \Delta x, \quad \text{Equation (3)}$$

$$W = \frac{1}{2} A (P_0 + P_1)(x_1 - x_0), \quad \text{Equation (4)}$$

where A is the effective area of the actuator piston, $P_{avg}$ is the average pressure during the time interval T, and $\Delta x$ is the change in position of the actuator piston.

Figure 4:
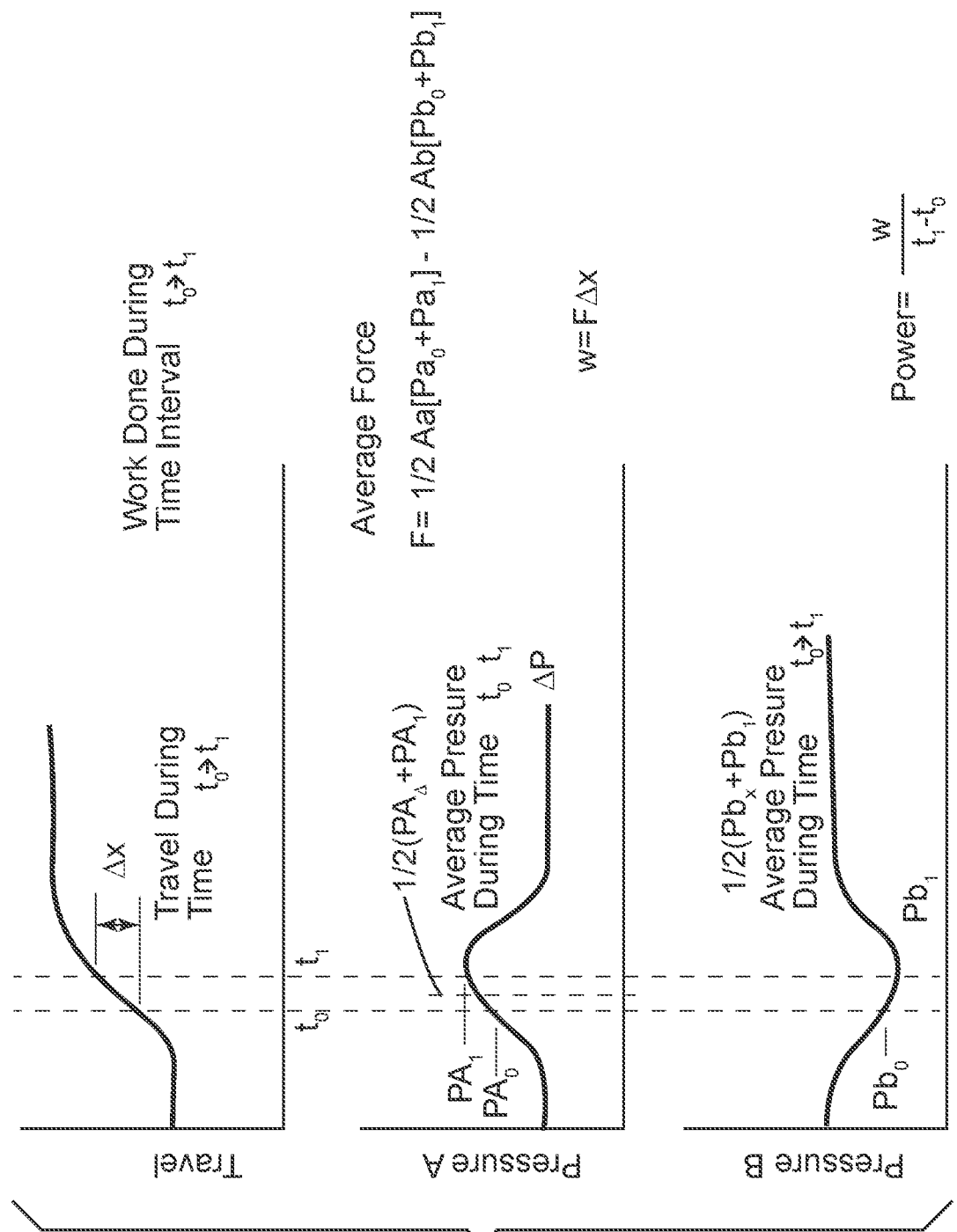
FIG. 4 depicts a performance curve for an example of an actuator for use with the controller of FIG. 1.

FIG. 4 illustrates a performance curve for an example of a double-acting device. Actuator pressure in this device may act either in a direction that is the same as travel or in a direction that is opposite direction of travel. The value for work W in this case may depend on forces that act on both sides of the actuator piston. This value may be calculated according to Equations (5) and (6) below:

$$W = [(A_a \times Pa_{avg}) - (A_b \times Pb_{avg})] \Delta x, \quad \text{Equation (5)}$$

$$W = \left[ \frac{1}{2} A_a (Pa_0 + Pa_1) - \frac{1}{2} A_b (Pb_0 + Pb_1) \right](x_1 - x_0), \quad \text{Equation (6)}$$

where $A_a$ is the effective area of side "A" of the actuator piston, Ab is the effective area of side "B" of the actuator piston, $Pa_{avg}$ is the average pressure on side "A" of the actuator piston during time interval T, and $Pb_{avg}$ is the average pressure on side "B" of the actuator piston during time interval T.

As noted above, energy E can then be calculated over the time interval that corresponds to data points $P_{0,x0} \rightarrow P_{1,x1}$ according to Equation (2).

At stage 206, the method 200 may compare the energy E to some threshold value. The relationship between these two values may indicate problems on the device or, in some cases, problems with the process or process line. Operators may expect the device to consume a certain baseline amount of energy. Values for energy E that are higher or lower than this expected value might indicate problems on the device. These problems might also manifest as an aggregate value for energy E that trends higher or lower over a prescribed time period, for example, a typical operating period for the process line. These trends may also indicate instability in the process to the extent the device (or devices across the process line) consumes more or less energy than operators expect to maintain process parameters at or near prescribed levels. Operators that are made aware of these instabilities or fluctuations may avoid quality control issues, for example, operators may observe variations in energy E use by the device concomitantly with a reduction in quality of the end product.

At stage 208, the method 200 may generate some type of output that corresponds with the energy E. This output may embody an indicator that can vary in type or delivery, as desired. Alarms may find use in facilities as means to draw attention to devices in the field. The indicator may also manifest as an email or text message (or like electronic indicator) on a portable computing devices, like a smart phone or tablet.

The output may find use as part of a diagnostic system, as well. This system may embody software that runs on the DCS or a collateral computer system. Examples of the software may generate a user interface, for example, on or through a web browser. Diagnostic software packages may find it useful for the user interface to show problematic devices in different colors, fonts, or animation. The user interface may also display plots or graphs of data that describes operation of one or more flow controls. The plots may show trends in energy E over time. These trends may lead operators to identify problematic devices if, for example, the trend in energy E increases or decreases away from an expected value or threshold. Operators may use this visual trend data to manually generate the alert. This action may cause preventative maintenance to occur outside of the operator's normal maintenance schedule. This feature may prove beneficial because it can head off certain issues that may grow into larger problems that affect the entire process line.

Figure 5:
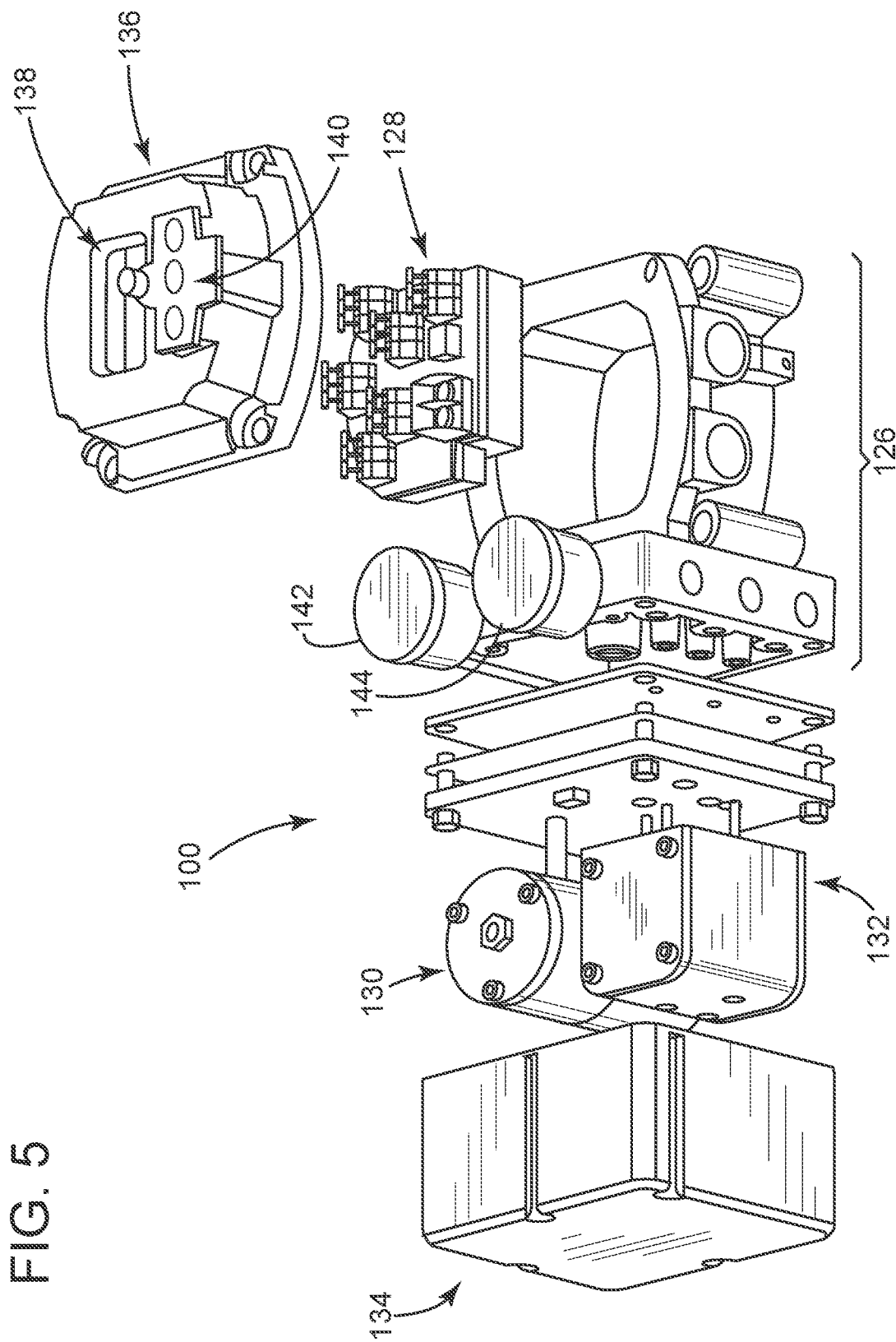
FIG. 5 depicts a perspective view of an example of the controller of FIG. 1.

FIG. 5 depicts a perspective view of an example of the controller 100 in exploded form. This structure may include a manifold having a manifold body 126, typically machined or formed metal, plastic or composite. The device may include one or more boards 128 with processing hardware disposed thereon. Other hardware may include a current-to-pressure converter 130 and a relay 132. These devices may generate the actuator control signal S2 that the controller 100 delivers to the actuator 118. As also shown, the structure may include an enclosure, shown as covers 134, 136 in this example. The covers 134, 136 may secure to the manifold body 126 to protect the control components from conditions that prevail in the environment surrounding the flow control 108. The cover 136 may incorporate a display 138 and a pushbutton input device 140 that may operate as the primary local user interface to allow an end user (e.g., technician) to interact with the controller 100. This feature may be important for regular maintenance, configuration, and setup, for example, to allow the end user to exit from valve operating mode and step through a menu structure to manually perform functions such as calibration, configuration, and monitoring. In one implementation, the structure may further include one or more gauges 142, 144 that can provide an indication of the flow conditions (e.g., pressure, flow rate, etc.) of the fluid that the controller 100 uses to operate the flow control 108.

Figure 6:
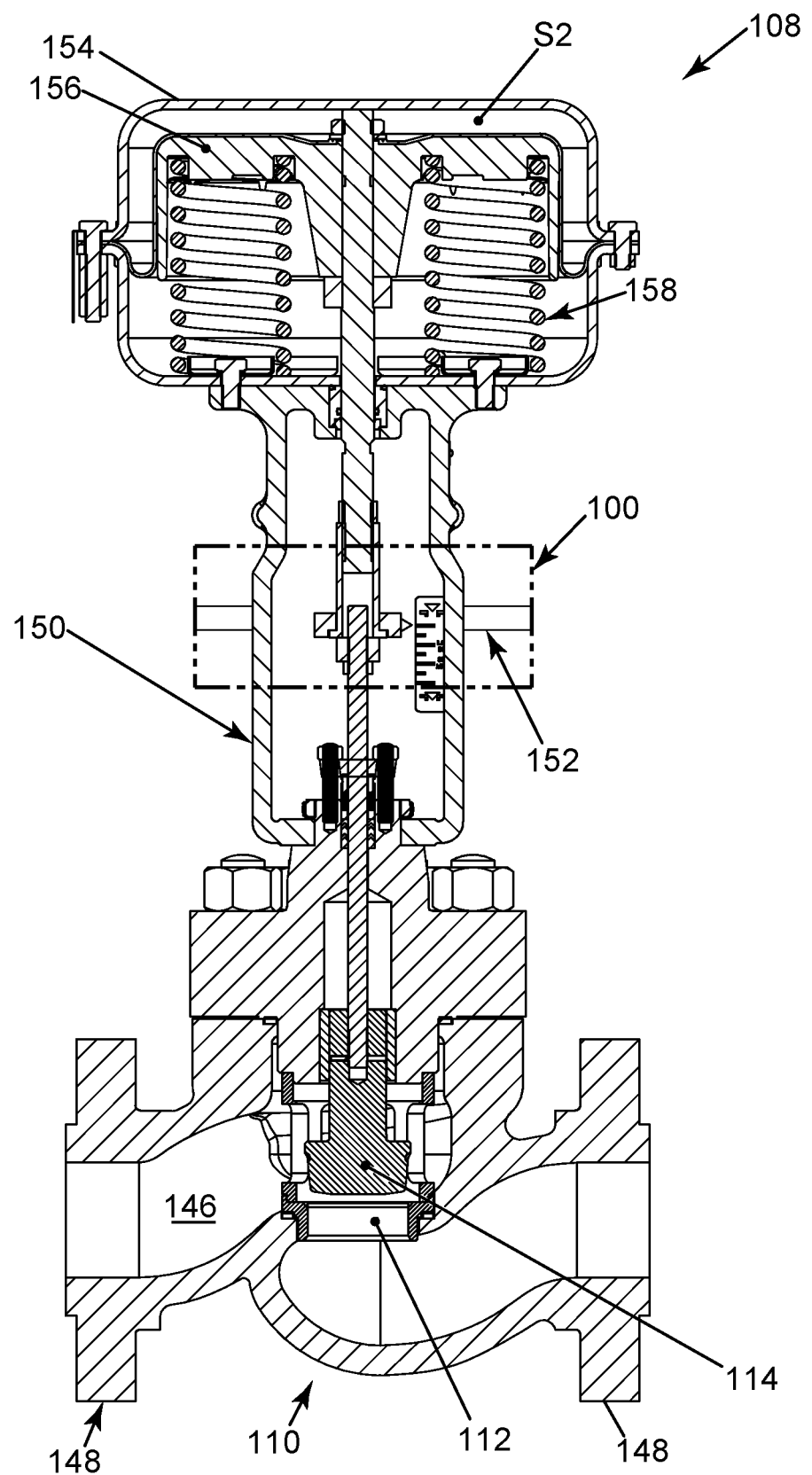
FIG. 6 depicts a plan view of the cross-section of an example of a flow control that incorporates an example of the controller of FIG. 1.

FIG. 6 depicts a perspective view of exemplary structure for the flow control 108. The valve body 110 may form a flow path 146 with flanged, open ends 148. The controller 100 may fasten to a yoke 150 that is part of the flow control 108, for example, using a bracket 152. Fasteners such as bolts are useful for this purpose. Valve components like the seat 112 and the closure member 114 may reside inside of the body 110. In one implementation, the actuator 118 may include a housing 154 that couples with the yoke 150. The housing 154 may enclose a piston 156 and a spring 158 (which together form at least part of the piston assembly 120). As noted herein, the actuator control signal S2 may pressurize an upper portion or a lower portion of the housing 154 to act on one side (for single-acting design) or both sides (for double-acting design) of the actuator piston 156. This feature affects the position of the closure member 114 to regulate flow through the valve body 110.

In light of the foregoing, the improvements herein evaluate energy of a control valve or other flow control. The embodiments take advantage of data that is readily available, but often not leveraged for purposes of diagnostics. This feature offers operators important insight into operation of their equipment without the need to add additional sensors.

Examples appear below that include certain elements or clauses one or more of which may be combined with other elements and clauses to describe embodiments contemplated within the scope and spirit of this disclosure. The scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flow control, comprising:
a valve assembly comprising a yoke, a pneumatic actuator having an actuator piston and coupled to a first end of the yoke, a valve body coupled to a second end of the yoke, the valve body housing a closure member therein;
a feedback mechanism that is configured to generate data that corresponds with position of the closure member and pressure of an actuating signal that pressurizes the pneumatic actuator; and
a controller mounted to the yoke of the valve assembly between the pneumatic actuator and the valve body and coupled with the feedback mechanism, the controller having operating hardware that is configured to calculate a value for energy use using the data according to, $$E = \frac{w}{t_1 - t_0},$$

wherein, when the pneumatic actuator is a single-acting device, $t_1-t_0$ is a time interval, $W=\frac{1}{2}A(P_0+P_1)(x_1-x_0)$, A is the effective area of the actuator piston, $P_0+P_1$ is the change in pressure of the actuator signal during the time interval T, and $x_1-x_0$ is the change in position of the closure member, and
wherein, when the pneumatic actuator is a double-acting device, $$W = \left[\frac{1}{2}A_a(Pa_0 + Pa_1) - \frac{1}{2}A_b(Pb_0 + Pb_1)\right](x_1 - x_0)$$

$A_a$ is the effective area of side "A" of the actuator piston, $A_b$ is the effective area of side "B" of the actuator piston, $Pa_0$ is pressure of the actuator signal on side "A" at time $t_0$, $Pb_0$ is pressure of the actuator signal on side "B" at time $t_0$, $Pa_1$ is pressure of the actuator signal on side "A" at time $t_1$, and $Pb_1$ is pressure of the actuator signal on side "B" at time $t_1$.

2. The flow control of claim 1, wherein the operating hardware is further configured to compare the value to a baseline level.

3. The flow control of claim 1, wherein the operating hardware is further configured to generate an alert in response to the value.

4. The flow control of claim 1, wherein the value represents energy use during operation of the process line for a prescribed period of time.

5. The flow control of claim 1, wherein the closure member comprises a metal disc.

6. The flow control of claim 1, wherein the closure member comprises a metal plug.

7. The flow control of claim 1, further comprising:
a valve stem coupled to the actuator and to the closure member.

8. A flow control, comprising:
a valve comprising a yoke, a pneumatic actuator having an actuator piston and coupled to a first end of the yoke, and a valve body coupled to a second end of the yoke;
a controller mounted to the yoke of the valve assembly between the pneumatic actuator and the valve body, the controller generating an actuator control signal to the pneumatic actuator to regulate flow of material through the valve; and
executable instructions on the controller for,
calculating energy use of the valve according to, $$E = \frac{w}{t_1 - t_0},$$

wherein, when the pneumatic actuator is a single-acting device, $t_1 - t_0$ is a time interval, $$W = \frac{1}{2}A(P_0 + P_1)(x_1 - x_0)$$

A is the effective area of the actuator piston, $P_0 + P_1$ is the change in pressure of the actuator signal during the time interval T, and $x_1 - x_0$ is the change in position of the closure member, and
wherein, when the pneumatic actuator is a double-acting device, $$W = \left[\frac{1}{2}A_a(Pa_0 + Pa_1) - \frac{1}{2}A_b(Pb_0 + Pb_1)\right](x_1 - x_0)$$

$A_a$ is the effective area of side "A" of the actuator piston, $A_b$ is the effective area of side "B" of the actuator piston, $Pa_0$ is pressure of the actuator signal on side "A" at time $t_0$, $Pb_0$ is pressure of the actuator signal on side "B" at time $t_0$, $Pa_1$ is pressure of the actuator signal on side "A" at time $t_1$, and $Pb_1$ is pressure of the actuator signal on side "B" at time $t_1$.

9. The flow control of claim 8, wherein the executable instructions comprise instructions for comparing the energy use to a baseline level.

10. The flow control of claim 8, wherein the executable instructions comprise instructions for generating an alert in response to the energy use.

11. The flow control of claim 1, wherein the feedback mechanism generates the data in real-time.

12. A flow control, comprising:
a valve assembly comprising a yoke, a pneumatic actuator having a flexible diaphragm and coupled to a first end of the yoke, a valve body coupled to a second end of the yoke, the valve body housing a closure member therein;
a feedback mechanism that is configured to generate data that corresponds with position of the closure member and pressure of an actuating signal that pressurizes the pneumatic actuator; and
a controller mounted to the yoke of the valve assembly between the pneumatic actuator and the valve body and coupled with the feedback mechanism, the controller having operating hardware that is configured to calculate a value for energy use using the data according to, $$E = \frac{w}{t_1 - t_0},$$

wherein, when the pneumatic actuator is a single-acting device, $t_1 - t_0$ is a time interval, $W = \frac{1}{2} A(P_0 + P_1)(x_1 - x_0)$, A is the effective area of the flexible diaphragm, $P_0 + P_1$ is the change in pressure of the actuator signal during the time interval T, and $X_1 - X_0$ is the change in position of the closure member, and
wherein, when the pneumatic actuator is a double-acting device, $$W = \left[\frac{1}{2}A_a(Pa_0 + Pa_1) - \frac{1}{2}A_b(Pb_0 + Pb_1)\right](x_1 - x_0),$$

$A_a$ is the effective area of side "A" of the flexible diaphragm, $A_b$ is the effective area of side "B" of the flexible diaphragm, $Pa_0$ is pressure of the actuator signal on side "A" at time $t_0$, $Pb_0$ is pressure of the actuator signal on side "B" at time $t_0$, $Pa_1$ is pressure of the actuator signal on side "A" at time $t_1$, and $Pb_1$ is pressure of the actuator signal on side "B" at time $t_1$.

13. The flow control of claim 12, wherein the operating hardware is further configured to compare the value to a baseline level.

14. The flow control of claim 12, wherein the operating hardware is further configured to generate an alert in response to the value.

15. The flow control of claim 12, wherein the operating hardware is further configured to generate a text message in response to the value.

16. The flow control of claim 12, wherein the operating hardware is further configured to generate an output in response to the value.

17. The flow control of claim 12, wherein the feedback mechanism generates the data in real-time.

18. The flow control of claim 12, wherein the closure member comprises a metal disc.

19. The flow control of claim 12, wherein the closure member comprises a metal plug.

20. The flow control of claim 12, further comprising:
a valve stem coupled to the actuator and to the closure member.

* * * * *